United States Patent [19]
Parker

[11] Patent Number: 5,221,714
[45] Date of Patent: Jun. 22, 1993

[54] BLEND OF RUBBER LATICES CONTAINING A HYDROGENATED RUBBER LATEX

[75] Inventor: Dane K. Parker, Massillon, Ohio

[73] Assignee: The Goodyear Tire & Rubber Company, Akron, Ohio

[21] Appl. No.: 680,657

[22] Filed: Apr. 4, 1991

[51] Int. Cl.$^5$ .............................................. C08L 9/06
[52] U.S. Cl. .................................. 525/237; 525/236; 524/525; 524/526
[58] Field of Search ................ 524/525, 526; 525/236, 525/237

[56] References Cited

U.S. PATENT DOCUMENTS

| | | |
|---|---|---|
| 2,788,334 | 4/1957 | Bennett et al. ............... 525/237 |
| 3,573,246 | 3/1971 | Bennett ......................... 524/526 |
| 4,336,356 | 6/1982 | Aharoni et al. ............... 525/388 |
| 4,452,950 | 6/1984 | Wideman ...................... 525/339 |
| 4,954,614 | 9/1990 | Schiessl et al. ............... 528/483 |
| 5,039,737 | 8/1991 | Parker et al. .................. 524/804 |
| 5,057,601 | 10/1991 | Schiessl et al. .............. 528/483 |

FOREIGN PATENT DOCUMENTS 1184120 3/1970 United Kingdom ................ 525/237

Primary Examiner—Paul R. Michl
Assistant Examiner—Olga Asinovsky
Attorney, Agent, or Firm—Bruce J. Hendricks

[57] ABSTRACT

The present invention relates to a blend of rubber latices comprising, based on dry weight,
(A) from about 80 to about 50 phr of a latex selected from the group consisting of polybutadiene latex, natural rubber or polyisoprene latex, styrene-butadiene copolymer latex, acrylonitrile-butadiene copolymer latex, butadiene-isoprene copolymer latex, isoprene-isobutylene copolymer latex, styrene-isoprene-butadiene copolymer latex and mixtures thereof: and
(B) from about 20 to about 50 phr of a hydrogenated rubber latex that is prepared in accordance with a process comprising:
(1) combining an unsaturated polymer in latex form, which is derived from 5 to 100 percent by weight of a conjugated diene monomer and 95 to 0 percent by weight of an ethylenically unsaturated monomer, with
(a) an oxidant selected from the group consisting of oxygen, air and hydroperoxides;
(b) a reducing agent selected from hydrazine and hydrates thereof: and
(c) a metal ion activator;
(2) heating the mixture to a temperature from 0° C. to the reflux temperature of the reaction mixture.

11 Claims, 1 Drawing Sheet

STATIC OZONE CRACKING SEVERITY

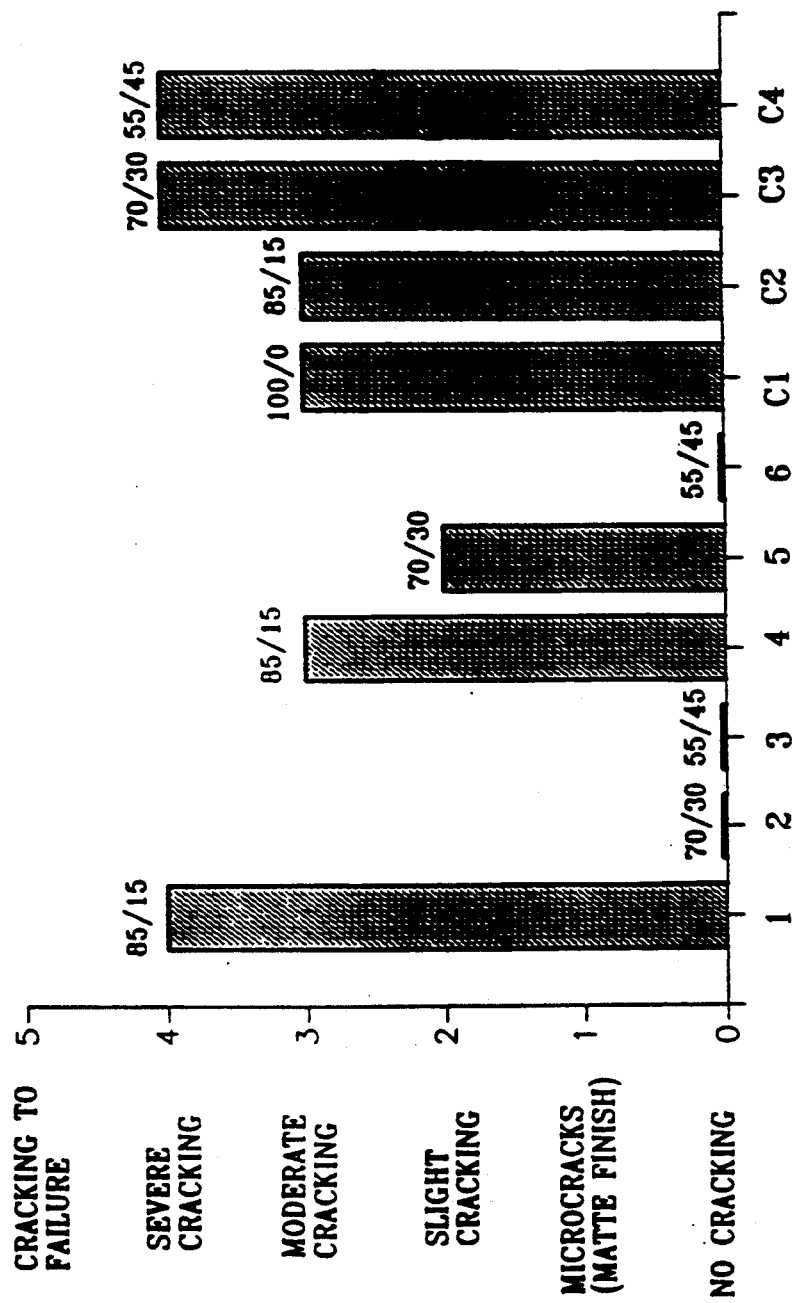

BLEND OF RUBBER LATICES CONTAINING A HYDROGENATED RUBBER LATEX

BACKGROUND OF THE INVENTION

In some cases, it is desirable to hydrogenate rubber to improve resistance to oxidative and thermal degradation. For example, it is sometimes beneficial to hydrogenate nitrile rubbers which are utilized in applications where there is exposure to high operating temperatures. The hydrogenation of polymers has conventionally been accomplished by solution techniques which require the use of highly reactive chemicals or heterogeneous catalysts. Unfortunately, such techniques present handling and application difficulties. However, these difficulties are overcome by hydrogenating the rubber in latex form as described in U.S. Pat. No. 4,452,950 to Lawson G. Wideman.

The process disclosed by Wideman involves the hydrogenation of carbon-carbon double bonds of an unsaturated polymer which comprises (a) combining an unsaturated polymer in latex form with (1) an oxidant selected from the group consisting of oxygen, air and hydroperoxides; (2) a reducing agent selected from the group of hydrazine and hydrates thereof; and (3) a metal ion initiator: and (b) heating the mixture to a temperature from 0° C. to the reflux temperature of the reaction mixture. There are, of course, many advantages associated with hydrogenating the elastomeric polymer in latex form by the process of Wideman. However, there are difficulties which must be overcome to render the hydrogenated latex commercially viable. For example, when high degrees of saturation are attained by the Wideman process, crosslinking of the polymer within the individual latex particles typically occurs. This is due to concurrent crosslinking of the elastomeric polymer which occurs as a side reaction during the reduction procedure. Such crosslinking is often undesirable with it usually being preferred for the elastomeric polymer to be uncrosslinked.

SUMMARY OF THE INVENTION

The dried rubber from the blend of rubber latices of the present invention has superior ozone resistance when compared to the dried rubber from the nonhydrogenated component of the blend and superior processing properties when compared to the dried rubber from the hydrogenated component of the blend.

BRIEF DESCRIPTION OF THE DRAWING

FIG. 1 is a graphic depiction of the ozone testing data of the samples of Table III.

DETAILED DESCRIPTION OF THE INVENTION

The present invention relates to a blend of rubber latices comprising, based on dry weight, (A) from about 80 to about 50 phr of a nonhydrogenated latex selected from the group consisting of natural rubber latex, polybutadiene latex, styrene-butadiene copolymer latex, synthetic polyisoprene latex, acrylonitrile-butadiene copolymer latex, butadiene-isoprene copolymer latex, isoprene-isobutylene copolymer latex, styrene-isoprene-butadiene copolymer latex and mixtures thereof; and (B) from about 20 to about 50 phr of a hydrogenated rubber latex that is prepared in accordance with a process comprising:

(1) combining a natural rubber latex and/or an unsaturated polymer in latex form, which is derived from 5 to 100 percent by weight of a conjugated diene monomer and 95 to 0 percent by weight of an ethylenically unsaturated monomer, with (a) an oxidant selected from the group consisting of oxygen, air and hydroperoxides:

(b) a reducing agent selected from hydrazine and hydrates thereof: and (c) a metal ion activator:

(2) heating the mixture to a temperature from 0° C. to the reflux temperature of the reaction mixture.

From about 80 to about 50 phr of the latex blend is a nonhydrogenated latex selected from the group consisting of polybutadiene latex, natural rubber, styrene-butadiene copolymer (SBR) latex, synthetic polyisoprene latex, acrylonitrile-butadiene copolymer (NBR) latex, butadiene-isoprene copolymer latex, isoprene-isobutylene copolymer latex, styrene-isoprene-butadiene (SIBR) copolymer latex and mixtures thereof. Preferably, the blend of latices comprise from about 70 to about 55 of the nonhydrogenated latex. When selecting the particular nonhydrogenated latex to be used in the blend, it is preferable to use the same basic polymer (originally derived from same monomers) as is used for the hydrogenated latex. For example, when the hydrogenated latex is a hydrogenated NBR, it is preferred to use an emulsion NBR as the nonhydrogenated latex.

The solids content, also known as percent solids, of the nonhydrogenated latex may vary. For example, the percent solids may range from about 5 to about 70. Preferably, the percent solids ranges from about 10 to about 40.

The nonhydrogenated latex is prepared in accordance with conventional emulsion polymerization techniques. The principles of emulsion polymerization are discussed in references such as "Synthetic Rubber" by G. S. Whitby, Editor-in-Chief, John Wiley and Sons, 1954, particularly Chapter 8, and "Emulsion Polymerization" by F. A. Bovey et al, Vol. IX of "High Polymers", Interscience Publishers, Inc., 1955. Some specialized applications of these principles are indicated in U.S. Patents such as U.S. Pat. Nos. 3,080,334: 3,222,334: 3,468,833 and 3,099,650.

Conventional free radical polymerization initiators that are used in emulsion polymerizations include compounds such as t-butyl hydroperoxide, cumene hydroperoxide, diisopropylbenzene hydroperoxide and para-menthane hydroperoxides, and even hydrogen peroxide. These compounds perform very effectively when used in polymerization recipes containing appropriate levels of supporting ingredients. By "supporting ingredients" is meant those materials often referred to as activators in emulsion, or other systems where required. U.S. Pat. No. 3,080,334 describes some of these materials at column 5, lines 20–26. Such materials can also be referred to as catalyst activators. The term "Redox Polymerization" is often used where the complete initiator system includes a redox system, i.e., reducing agents and oxidizing agents in a proportion that yields polymerization initiating species. All of these initiator systems are well known in the art.

Emulsion polymerizations are normally accomplished in the range of 5° C. to 90° C. Though the activator or "redox" initiated systems are preferred for low temperature polymerizations, they are very effective at high temperatures also, normally requiring appreciably lower quantities of the various ingredients to obtain a desirable polymerization rate.

The free radical sources used in the initiator systems are those customarily used in free radical polymerizations, for example, organic initiators such as azonitriles, azo-derivatives, peroxides and hydroperoxides and inorganic initiators such as inorganic peroxy compounds. Radiation, e.g., of the ultraviolet and gamma ray type can also be used as a free radical source. Various organic initiators are described by J. Brandrup and E. H. Immergut, Polymer Handbook (John Wiley & Sons), 1965, pages II-3 to II-51. The pH of the nonhydrogenated latex emulsion generally ranges from about 7-5 to 13. Preferably, the pH ranges from about 8 to 11.

The nonhydrogenated latex emulsion may also contain various conventional compounds such as surface active agents, short stop materials such as di-tertiary-butyl hydroquinone and similar compounds, all of which are present in small amounts. The surface active agents may consist of emulsifiers comprising the salts of natural acids such as potassium stearate, potassium-processed rosin, and the like, or such surface active agents may be synthetics such as alkali metal salts of alkyl aryl sulfonic acid, particularly alkylbenzene sulfonic acid, condensed naphthalene-formaldehyde sulfonic acid, and the like, or non-ionics such as polyalkylene oxide dioleates, sorbitan trioleate, alkylolamides, the condensation products of nonyl phenol with ethylene oxide or propylene oxide-ethylene oxide products. Preferably, anionic type surfactants are used such as potassium stearate, potassium-processed rosin, and the alkali metal salts of alkylbenzene sulfonic acid.

The hydrogenated latex which is used in accordance with this invention may be made by the process of U.S. Pat. No. 4,452,950 issued to Wideman, the teachings of which are incorporated herein by reference in their entirety. The technique of Wideman is essentially a process for hydrogenating carbon-carbon double bonds in an unsaturated elastomeric polymer in latex form which comprises combining the unsaturated elastomeric polymer latex with (1) an oxidant selected from the group consisting of oxygen, air and hydroperoxides; (2) a reducing agent selected from the group consisting of hydrazine and hydrates of hydrazine: and (3) a metal ion activator. This hydrogenation reaction can be carried out at virtually any temperature within the range of about 0° C. to about 300° C. It is generally preferred to conduct the hydrogenation reaction at a temperature within the range of about 20° C. to about 150° C. with temperatures of less than 100° C. being most preferred to ensure selective hydrogenation and to inhibit undesirable side-reactions. This hydrogenation reaction is typically carried out at a temperature ranging from atmospheric pressure to 300 kg/cm$^2$.

Oxygen will typically be utilized in carrying out the hydrogenation procedure of Wideman. However, it is also possible to utilize air or other oxidants such as hydrogen peroxide, cumyl hydroperoxide, t-butyl hydroperoxide, p-menthane hydroperoxide, and the like. A wide variety of metals having ions or salts which will react with hydrazine can be utilized as the metal ion activator. Antimony, arsenic, bismuth, cerium, chromium, cobalt, copper, gold, iron, lead, manganese, mercury, molybdenum, nickel, osmium, palladium, platinum, cerium, silver, tellurium, tin, and vanadium are representative of metals having ions or salts which will react with hydrazine and which are accordingly useful in the hydrogenation technique of Wideman as the metal ion activator. Copper and iron are preferred metal ion activators with copper being most preferred.

It is also well known that various agents such as hydroquinone, catechol, quinone, o-phenylene diamine, and cerium, will catalyze the reaction between hydrogen peroxide or oxygen and hydrazine. Such reactions are described by Zhong and Lim, "The Copper-Catalyzed Redox Reaction Between Aqueous Hydrogen Peroxide and Hydrazine. 1. New Experimental Results and Observations", Journal of The American Chemical Society, Vol. 111, No. 22, pages 8398-8404 (1989) at page 8401. In accordance with the teachings of Zhong and Lim, hydroquinone can be utilized to catalyze the reaction of oxygen with residual hydrazine in an aqueous emulsion of a rubber reduced in accordance with the process of Wideman. By utilizing this technique, the level of residual hydrazine in a latex can be reduced from typical levels of about 1 to 2 percent to levels within the range of about 50 ppm to about 100 ppm. This can be accomplished by simply mixing oxygen and a small amount of the catalyst, such as hydroquinone, catechol, quinone, or o-phenylene diamine into the latex containing residual hydrazine. This procedure may be accelerated by increasing the catalyst concentration, temperature and oxygen pressure as desired. Typically from about 0.001 phr to about 1 phr (parts per weight per hundred parts of rubber) of the catalyst will be utilized. In most cases the amount of catalyst employed will be within the range of about 0.05 phr to about 0.25 phr. Unfortunately, this procedure is not a total answer to the problem because it will not normally reduce levels of residual hydrazine to the extremely low levels desired. However, it is often desirable to utilize this crude technique as an intermediate measure for reducing the level of residual hydrazine in latex. In other words, it is often desirable to initially treat latex with oxygen or hydrogen peroxide and a catalyst to reduce the level of residual hydrazine in the latex to about 50 to 100 ppm and then to subsequently treat the latex with ozone in accordance with the process of the present invention.

Virtually any type of hydrogenated rubber latex can be used in the blend of the present invention. For example, the hydrogenated latex can be of a polybutadiene rubber, polyisoprene, nitrile rubber, carboxylated nitrile rubber, styrene-butadiene rubber, styrene-isoprene-butadiene rubber, etc. Such hydrogenated rubbers will typically have a saturation level of about 70% to about 99%. It is preferred for the hydrogenated rubber to have a saturation level of about 95% to about 98%.

The pH of the hydrogenated latex emulsion generally ranges from about 7.5 to 13. Preferably, the pH ranges from about 8 to 11.

The preferred hydrogenated rubber latex is further treated to lower the hydrazine level, prior to forming the blend of the present invention. The hydrazine level may be lowered by mixing the hydrogenated latex with an effective amount of ozone for a period of time which is sufficient to attain the desired results. This can be accomplished by bubbling ozone through the hydrogenated latex. It can also be done by rapidly agitating the hydrogenated latex under an ozone containing atmosphere. It may be desirable for the ozone containing atmosphere to be under pressure. Other techniques for mixing ozone throughout the hydrogenated latex being treated can also be employed. The temperature at which the ozone treatment procedure is carried out is not critical. In fact, virtually any temperature between the freezing point of the latex and its boiling point can be utilized. However, for practical reasons, the hydrogenated latex will normally be treated with ozone at a temperature which is within the range of about 0° C. to about 60° C. A temperature within the range of about 15° C. to about 30° C. will most preferably be employed. Higher temperatures can result in reduced solubility of the ozone in the hydrogenated latex even through faster reaction rates may be attained. The ozone treatment will be carried out for a time which is sufficient to eliminate undesirable levels of crosslinking and which is sufficient to reduce residual hydrazine concentrations to acceptable levels. The treatment time employed will typically be within the range of about 15 minutes to about 6 hours. The period of time utilized in treating the hydrogenated latex with ozone will more typically be within the range of about 30 minutes to about 2 hours.

The gelation which can occur during the hydrogenation procedure is believed to be essentially due to crosslinking of the elastomeric polymer in the emulsion. By treating the emulsion of the crosslinked elastomeric polymer with ozone, an ozonolysis reaction occurs. In this ozonolysis reaction, the remaining double bonds in the crosslinked rubber are attacked with ozonides being formed. The ozonides formed under the low temperature condition of the reaction are highly unstable and are largely destroyed by basic hydrolysis at the elevated pH's of the latex. This results in the cleavage of the crosslinked elastomeric polymer into rubber segments of lower molecular weight which are generally terminated with aldehyde groups. Continued ozonolysis will subsequently oxidize a portion of the initial aldehyde groups to carboxylic acid groups. The terminal aldehyde groups on the rubber segments can also be reduced to alcohols by the addition of agents such as aqueous basic sodium borohydride solution at room temperature to approximately 80° C.

After the nonhydrogenated latex and the hydrogenated latex have been combined in the desired ratio, the later blend can be utilized in a conventional manner. The latex can also be coagulated to recover a dry rubber. Standard coagulation techniques, such as salt-acid coagulation procedures, can be employed. If the hydrogenated latex component has been ozonated, additional coagulant is preferably used, the amount of which will be dictated by the level of carboxylate generated.

Curing the dried rubber which is provided in accordance with the present invention may be cured by methods known to those skilled in the art. Such methods include sulfur and non-sulfur cure systems.

The present invention will be described in more detail in the following examples. These examples are merely for the purpose of illustration and are not to be regarded as limiting the scope of the invention or the manner in which it can be practiced. Unless specifically indicated otherwise, all parts and percentages are given by weight.

EXAMPLE 1

A nitrile rubber latex was hydrogenated by utilizing the general process of U.S. Pat. No. 4,452,950 to a saturation level of approximately 95-98%.

The hydrogenation was based on the following relative recipe: A 179.0 gram quantity of N612B NBR latex (commercially available from The Goodyear Tire & Rubber Company) containing 0.442 moles of double bonds, 3 drops of Dow Corning Antifoam 1430 ® and an aqueous solution of copper sulfate pentahydrate and Poly-tergent 2EP ® (a sodium dodecyldiphenylether disulfonate surfactant) from Olin Corporation in an amount sufficient to provide 0.0077 grams copper sulfate and 0.15 grams of surfactant were added to a 250 cm$^3$ four-neck flask equipped with a mechanical stirrer, thermometer, reflux condenser and an inlet tube for feeding hydrogen peroxide. A 23.5 ml charge of 64.4% aqueous hydrazine (0.487 moles, 110% of theory based on the moles of double bonds present) was then added to the stirred mixture before warming to 45°-50° C. At temperature, 35.3 ml of 49.8% hydrogen peroxide addition was complete. The reaction mixture was then allowed to stand at room temperature overnight before analysis. This hydrogenated latex was designated as HNBR-1 and had a solids content of 9.8 solids. 465 ml of HNBR-1 was ozonized for 3 hours at room temperature by passing the entire ozone output of a T-408 Welsbach ozonator (air feed) through the latex. A total of 0.267 moles of O$_3$ was passed through the 465 ml during the 3 hour period. This batch was then combined with another batch of approximately 400 ml of hydrogenated nitrile rubber latex that was ozonated in a like manner. The combined ozonated latices had a solids content of 10.6% and was designated HNBR-II.

An antioxidant masterbatch (AOMB) latex was used in preparation of all the samples. The antioxidant masterbatch was a 52/23/25 (by weight) terpolymer of butadiene/acrylonitrile/N-(4-anilinophenyl)-methacrylamide. In the recipes for each sample, 6.1 ml of the latex antioxidant masterbatch provided approximately 1 phr of antioxidant in the latex blend.

The nonhydrogenated latex used to prepare the blends was Chemigum ® N612B, a NBR latex commercially available from The Goodyear Tire & Rubber Company of Akron, Ohio.

Six latex blends (Samples A-F) were prepared using the dry weight ratio listed below:

TABLE I

| Blend | HNBR-1 | HNBR-II | NBR |
|---|---|---|---|
| A | — | 15 | 85 |
| B | — | 30 | 70 |
| C | — | 45 | 55 |
| D | 15 | — | 85 |
| E | 30 | — | 70 |
| F | 45 | — | 55 |

All the latex samples were individually coagulated at 70° C. by slow addition of the latex into a stirred solution containing 3-5% of aluminum sulfate by weight based on dry weight of rubber and several drops of a polyamine coagulation acid (Nalco Perchem 503). The polymer crumb was filtered, washed twice with excess water and dried in a circulating air oven at 60° C.

The polymer blends (Samples 1-6) were compounded according to the recipes shown in Table II below. N-550 and N-770 are designations of carbon black types as per ASTM-D-1765. Zetpol 2020 is a hydrogenated NBR commercially available from Nippon Zeon Co., Ltd. Zetpol 2020 has an acrylonitrile content of 36% and a Mooney viscosity of 80.

For purpose of comparison, controls 1-4 are listed in Table II below.

TABLE II

| Sample No. | 1 | 2 | 3 | 4 | 5 | 6 | Control 1 | Control 2 | Control 3 | Control 4 |
|---|---|---|---|---|---|---|---|---|---|---|
| HNBR-I | — | — | — | 15 | 30 | 45 | — | — | — | — |
| HNBR-II | 15 | 30 | 45 | — | — | — | — | — | — | — |
| N-612B | 85 | 70 | 55 | 85 | 70 | 55 | 100 | 85 | 70 | 55 |
| Zetpol 2020 | — | — | — | — | — | — | — | 15 | 30 | 45 |
| N-550 | 25 | 25 | 25 | 25 | 25 | 25 | 25 | 25 | 25 | 25 |
| N-770 | 25 | 25 | 25 | 25 | 25 | 25 | 25 | 25 | 25 | 25 |
| Sulfur | 0.3 | 0.25 | 0.20 | 0.3 | 0.25 | 0.20 | 0.3 | 0.3 | 0.25 | 0.20 |
| Stearic Acid | 1.0 | 1.0 | 1.0 | 1.0 | 1.0 | 1.0 | 1.0 | 1.0 | 1.0 | 1.0 |
| Zinc Oxide | 5.0 | 5.0 | 5.0 | 5.0 | 5.0 | 5.0 | 5.0 | 5.0 | 5.0 | 5.0 |
| DOP [1] | 10.0 | 10.0 | 10.0 | 10.0 | 10.0 | 10.0 | 10.0 | 10.0 | 10.0 | 10.0 |
| MBSS [2] | 1.0 | 0.83 | 0.65 | 1.0 | 0.83 | 0.65 | 1.0 | 1.0 | 0.83 | 0.65 |
| TMTD [3] | 1.7 | 1.4 | 1.1 | 1.7 | 1.4 | 1.1 | 1.7 | 1.7 | 1.4 | 1.1 |

[1] Dioctyl phthalate
[2] 2-benzothiazole-N-morpholyl disulfide
[3] Tetramethyl thiuramdisulfide For each sample, all of the ingredients, except MBSS and TMTD, were mixed for 5 minutes to a dump temperature of approximately 88° C. The MBSS and TMTD were then added on a warm mill.

All samples were press cured as standard 6×6×0.075 inch (152.4 mm×152.4 mm×1.9 mm) tensile sheets for 10 minutes at 171° C. and 1406 kg/cm² ram pressure.

Table III below lists the physical properties of the various cured samples. Samples 1-4 produced smooth surfaced clean vulcanizates. Samples 5 and 6 showed a textural surface. Controls 1-4 produced smooth surfaced clear vulcanizates.

TABLE III

| Sample No. | 1 | 2 | 3 | 4 | 5 | 6 | Control 1 | Control 2 | Control 3 | Control 4 |
|---|---|---|---|---|---|---|---|---|---|---|
| HNBR-I (phr) (ozonated) | | | | 15 | 30 | 55 | | | | |
| HNBR-II (phr) | 15 | 30 | 45 | | | | | | | |
| NBR | 85 | 70 | 55 | 85 | 70 | 45 | 100 | 85 | 70 | 55 |
| Zetpol 2020 | | | | | | | | 15 | 30 | 45 |
| Tensile (psi) | 1952 | 1845 | 1589 | 1976 | 1897 | 1705 | 2181 | 2087 | 1960 | 1666 |
| Elongation (%) | 676 | 623 | 532 | 569 | 565 | 510 | 591 | 633 | 705 | 762 |
| 100% Modulus | 329 | 368 | 395 | 352 | 340 | 325 | 340 | 363 | 321 | 308 |
| 200% Modulus | 642 | 708 | 752 | 726 | 689 | 683 | 719 | 726 | 626 | 566 |
| 300% Modulus | 976 | 1049 | 1067 | 1111 | 1077 | 1060 | 1138 | 1126 | 943 | 822 |
| 500% Modulus | 1571 | 1613 | 1536 | 1795 | 1732 | 1700 | 1920 | 1778 | 1509 | 1289 |
| Hardness | 66 | 66 | 70 | 68 | 68 | 68 | 69 | 65 | 67 | 63 |

3.175 mm wide dumbbell strips of cured samples 1-6 and controls 1-4 were statically tested in an ozone chamber at 50 pphm, 20% extension and 39° C. for a maximum of 120 hours. Sample 1, Sample 4, Control 1 and Control 2 showed severe cracking (3 to 4 rating with 5 being most severe) after 96 hours. Sample 1, Sample 4 and Control 1 and Control 2 all have 15 parts or less of a hydrogenated rubber. Samples 2 and 3 containing ozonized HNBR at 70/30 and 55/45 ratios showed no cracks after 12 hours. Unexpectedly, Control 3 and Control 4 with the same 70/30 and 55/45 ratio all showed severe cracking (4) after 96 hours and were indistinguishable from Control 1 which contained no HNBR. Sample 5 with unozonized HNBR at the 70/30 level showed a few large cracks at 96 hours whereas Sample 5 at the 55/45 ratio again showed no cracking after 120 hours. These results can be seen more clearly in FIG. 1.

While certain representative embodiments and details have been shown for the purpose of illustrating the subject invention, it will be apparent to those skilled in this art that various changes and modifications can be made without departing from the scope of the subject invention.

What is claimed is:

1. A blend of rubber latices comprising, based on dry weight,
    (A) from about 80 to about 50 phr of a latex selected from the group consisting of polybutadiene latex, styrene-butadiene copolymer latex, acrylonitrile-butadiene copolymer latex, butadiene-isoprene copolymer latex, isoprene-isobutylene copolymer latex, styrene-isoprene-butadiene copolymer latex and mixtures thereof: and
    (B) from about 20 to about 50 phr of a hydrogenated rubber latex that is prepared in accordance with a process comprising:
    (1) combining an unsaturated polymer in latex form, which is derived from 5 to 100 percent by weight of a conjugated diene monomer and 95 to 0 percent by weight of an ethylenically unsaturated monomer, with
        (a) an oxidant selected from the group consisting of oxygen, air and hydroperoxides:
        (b) a reducing agent selected from hydrazine and hydrates thereof: and
        (c) a metal ion activator:
    (2) heating the mixture to a temperature from 0° C. to the reflux temperature of the reaction mixture.

2. The blend of rubber latices of claim 1 wherein the hydrogenated rubber latex is derived from an unsaturated polymer selected from the group consisting of polybutadiene, synthetic polyisoprene, natural rubber, styrene-butadiene copolymer, acrylonitrile-butadiene copolymer, butadiene-isoprene copolymer, isoprene-isobutylene copolymer and mixtures thereof.

3. The blend of rubber latices of claim 2 wherein said hydrogenated rubber latex is prepared from an acrylonitrile-butadiene copolymer.

4. The blend of rubber latices of claim 1 wherein from about 80 to about 50 phr is an acrylonitrile-butadiene copolymer latex.

5. The blend of rubber latices of claim 1 wherein said hydrogenated rubber latex is a crosslinked elastomeric polymer emulsion that is reacted with ozone in an amount and under conditions which are sufficient for the ozone to react with the crosslinked elastomeric polymer to produce a latex of soluble elastomeric polymer.

6. The blend of rubber latices of claim 5 wherein the crosslinked elastomeric polymer emulsion is an acrylonitrile-butadiene latex.

7. The blend of rubber latices of claim 5 wherein the hydrogenated rubber latex is reacted with ozone at a temperature which is within the range of about 0° C. to about 60° C.

8. The blend of rubber latices of claim 7 wherein the temperature is within the range of about 15° C. to about 30° C.

9. The blend of rubber latices of claim 5 wherein said hydrogenated rubber latex is reacted with ozone for a period of time which is within the range of about 15 minutes to about 6 hours.

10. The blend of rubber latices of claim 5 wherein said soluble elastomeric polymer has a saturation level of about 90% to about 99%.

11. The blend of rubber latices of claim 5 wherein said soluble elastomeric polymer has a saturation level of about 95% to about 98%.

* * * * *